United States Patent [19]
Peters

[11] Patent Number: 5,226,329
[45] Date of Patent: Jul. 13, 1993

[54] FLOW SENSOR

[75] Inventor: Paulus J. Peters, Balgoy, Netherlands

[73] Assignee: I.S. Industrial Supply B.V., Netherlands

[21] Appl. No.: 638,166

[22] Filed: Jan. 4, 1991

[30] Foreign Application Priority Data

Nov. 16, 1990 [EP] European Pat. Off. ........ 90870214.5

[51] Int. Cl.⁵ .................................................. G01F 1/06
[52] U.S. Cl. .................................. 73/861.33; 73/861.79
[58] Field of Search ........... 73/861.32, 861.33, 861.79, 73/861.89

[56] References Cited

U.S. PATENT DOCUMENTS

| | | | |
|---|---|---|---|
| 3,413,995 | 12/1968 | Bowles et al. | 73/861.32 X |
| 3,572,118 | 3/1971 | Hilzendegen | 73/861.79 |
| 3,884,069 | 5/1975 | Lind | 73/861.32 |
| 4,089,220 | 5/1978 | Houlberg | 73/861.32 |
| 4,131,017 | 12/1978 | Back | 73/861.79 |
| 4,512,201 | 4/1985 | Konrad | 73/861.79 |

FOREIGN PATENT DOCUMENTS 0016928 10/1980 European Pat. Off. .
0031629 7/1981 European Pat. Off. .
1279355 7/1958 Fed. Rep. of Germany .

OTHER PUBLICATIONS

*Control Engineer*, vol. 5, No. 6, Jun. 1958, p. 95.

Primary Examiner—Herbert Goldstein
Attorney, Agent, or Firm—Wood, Phillips, VanSanten, Hoffman & Ertel

[57] ABSTRACT

The invention relates to a flow sensor, particularly a fluid flow meter, comprising a cylindrical housing wherein, at least locally, near a rotor mounted in said housing, a helicoidally moving fluid flow is created by at least one jet propulsion activating element, characterized in that said jet propulsion activating element is formed in relief on a part of the inner wall of said housing (1) and is manufactured together with the latter in one step, and further characterized in that said housing (1) is closed by a stop plate (6), except for at least one passage (10), however, between the outer circumference of the stop plate and the inner circumference of said housing (1).

18 Claims, 3 Drawing Sheets

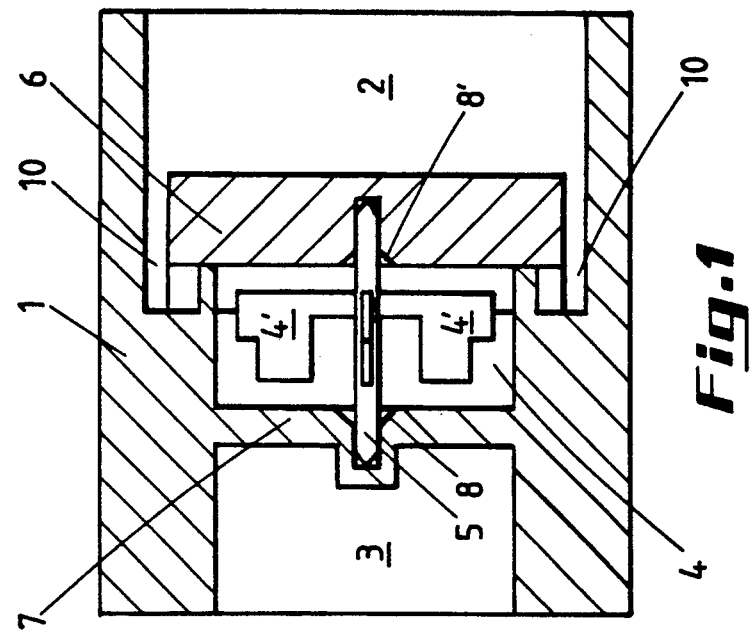
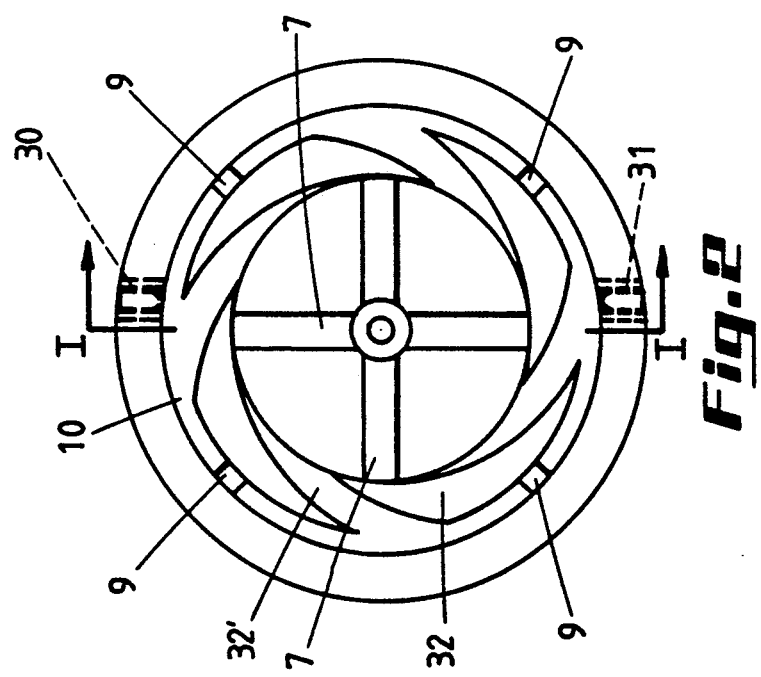

FLOW SENSOR

This invention relates to a flow sensor, particularly a fluid flow meter, comprising a cylindrical housing wherein, at least locally, near a rotor mounted in said housing, a helicoidally moving fluid flow is created by at least one jet propulsion activating element.

Flow meters for gaseous or liquid fluids in which the fluid is made to whirl in a housing in order to act upon one rotor mounted in this housing, are known.

Such or technically equivalent structures are described in the following patents or patent applications: EP 0288577, NL 7909271 en NL 8003374.

The functioning of the flow meters according to these patents is based onto a simple principle. In a cylindrical housing a wormlike insert is mounted which imparts a spiral motion to the fluid circulating axially through the housing.

By counting the rotations of the rotor, a read out can be obtained which corresponds to the passed fluid amount.

One will observe that the flow meters described in these patent applications all comprise an insert having at least one peripheral spiral channel. The object of the insert is clearly to make the passing fluid to whirl.

Such flow meters provided with inserts, present serious drawbacks. It has appeared for example extremely difficult to manufacture the insert which has to fit closely in the housing, with a great accuracy and without mutual deviation (deviation > 1%).

This insert has been made from synthetic material by means of a so-called screw mould. The edges of the helicoidal channels of the insert are "sharp". In practice this implies that "demoulding" from the mould will cause little frayed ends and other irregularities. Due to the sharp edges, the material thickness of the spiral channels walls is not everywhere the same. For synthetic material, this implies that the curing of these materials reaches very critical limits when manufacturing said insert.

It may be useful to specify that the insert (usually four spiral channels) has in many cases dimensions of 4.6 mm × 4 mm. The channel width is then 1 mm at the most whereas the wall thickness ranges then from 0.4 mm to 0.2 mm. A deviation of 0.05 mm implies that the opening filling insert, which has already to be applied with pressure, is subjected to an additional pressure which is not visible by eye, and which will influence the accuracy or exactitude of the measurement negatively. It has been determined experimentally that in the liquid meters according to the hereabove patents or patent applications, from a deviation of 0.02 mm when manufacturing the insert, a flow deviation is obtained which can be expressed in procents. Notwithstanding these drawbacks, which are related as well to the manufacture of the insert as to its assembling in the housing, this component remains the heart of said liquid meters. Further there are still different reasons which causes that this insert, which can be called in some way the heart of both flow meters, is a very problematic component because:

(a) the housing of the insert is provided with walls of 1 mm. Each deviation < 0.01 mm during the synthetic material pressing and the resulting film formation causes a measurement deviation of some percents;

(b) as already described, the insert has to be assembled helicoidally in the housing. This is done by means of a counter mould by which the head of the insert is protected, by the end of the counter mould, at the moment the insert is positioned against the stop edge;

(c) after the assembly of the insert, the flow meter has to be tested, notably for each meter the deviation has to be determined. As already explained herein before, the walls of the spiral channels, better known as the insert, are also used to clamp this piece in its housing. Due to the very small dimensions of all components, each deviation < than 0.01 mm implies a deformation of the housing which has a bad influence on the expected result. Each deviation > 0.01 mm results in a clamping of the insert in its housing of a lower quality. This means that for a prestressing of 0.020 mm, a deviation of 0.01 mm equals already 50%.

(d) The "heart" of the flow meters can only be tested if the two other elementary components (i.e. housing and rotor) are assembled together. However a product with mutual deviations will always be obtained. No two flow meters of this kind are similar within a small percentage. The impossibility to realize this is caused by the insert itself. Attempts to automatize the production of such and similar flow meters did not have any success. The reasons therefore have been explained herein above at different places. This results in a failure of a bigger production since the final product will always be a heterogenous product and in that the intermediate measurement controls, during the production will definitely remain necessary for each flow meter.

An object of the invention is now to design a flow sensor, particularly a fluid flow meter of a new and original concept which remedies completely the hereabove explained drawbacks and several problems related thereto, whereby a good production capacity can be obtained, an automatic assembling of the components can be assured and a flow sensor of very high quality can be expected.

In order to enable this according to the invention, said jet propulsion activating element is formed in relief on a part of the inner wall of said housing and is manufactured together with the latter in one step, which housing is delimited opstream with respect to said rotor by a stop plate serving as bearing for one end of the shaft of this rotor, whereas the other end of the latter bears in a little bridge which extends transversally through said chamber.

In a preferably implemented embodiment of the invention, at least one but preferably several passages are provided between said stop plate and the inner wall of said housing and the inner wall of said housing comprises several, for example four, continuous projections between which said stop plate is clamped.

In a possible embodiment, said stop plate is provided, at the side directed away from said rotor, with a bulge for directing the circulating fluid towards said passages.

A very remarkable characteristic of the invention consists in that said stop plate is provided at the side which is directed away from said bulge, with a disk shaped relief or local thickening of this disk, which disk shaped relief influences together with said jet propulsion activating elements the flow characteristics of the fluid depending on the height of said relief.

The jet propulsion activating elements which are very characteristic for the invention, can present several shapes for transforming the circulating fluid into an eddy current. These different embodiments will be described and treated separately hereinafter.

Other details and advantages of the invention will become apparent from the following description of a flow sensor, particularly a fluid flow meter according to the invention. This description is only given by way of example and does not limit the invention. The reference numerals relate to the annexed figures.

FIG. 1 is a longitudinal section through a flow sensor according to the invention.

FIG. 2 is a view from above on the sensor according to FIG. 1 wherein the stop plate and the rotor have been omitted.

Figure 3:
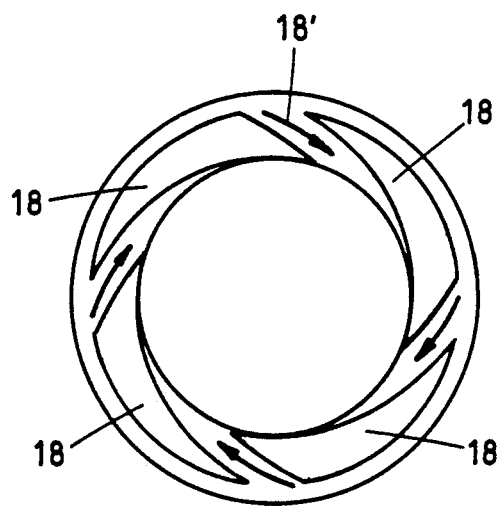
FIGS. 3 to 6 illustrate four possible embodiments of the jet propulsion activating elements according to the invention.

This flow sensor shown in the different figures consists of a housing 1 having wider and narrower spaces 2 and 3 respectively. A rotor 4 is mounted in the central axis of the housing 1, substantially at the dividing plane between the wider space 2 and the narrower space 3.

Upstream from the rotor 4, the shaft 5 of the latter bears in a stop plate 6 whereas downstream from the actual rotor the end of the shaft 5 bears in a little bridge 7 which extends in two directions through the space 2 of the housing 1. The little bridge 7 consists of a cross-shaped component. Both ends of the shaft 5 of the rotor 4 terminate into a point or in another shape and in order to assure the automatic and mechanical assembling of the rotor under good conditions, the stop plate 6 as well as the little bridge 7 show conically milled opening 8 and 8'.

The stop plate 6 is clamped between four inwards extending projections 9 (FIG. 2). The disc-shaped stop plate 6 can thus be pushed and clamped very easily into its place in the housing 1, at least in the wider space 2 of the latter between the four continuous projections 9. Such an arrangement makes the assembly of the components very much easier.

Between the inner wall of the housing 1, near the wider space 2 of the latter, and the outer edge of the stop plate 6, four passages 10 are thus formed. The fluid circulating in the housing 1 from the space 2 to the space 3 drives thus the blades 4' of the rotor 4 according to a direction which is substantially at right angles with respect to the shaft 5 of this rotor. In order to obtain this, several types of jet propulsion activating elements are possible according to the invention.

Characterizing for the invention is the fact that these jet propulsion activating elements form one part with the housing 1 and the little bridge 7. The big advantages resulting from this concept are very clear. Indeed, in contrast with the structures explained in the introductory part, in which use is made of an insert, the essential part of the flow sensor can now be manufactured in one step. As already mentioned, the essential part of the flow sensor comprises the housing 1, the little bridge 7 and said jet propulsion activating elements, the different possible embodiments of which will be described.

Figure 7:
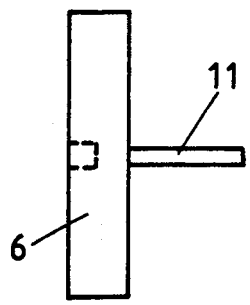
FIGS. 7 to 13 show on another scale side elevational views of different embodiments of the part of the stop plate from a sensor according to the invention which is situated upstream.

First the fact that upstream from the stop plate 6 a pin 11 can be provided (FIG. 7) can yet be pointed out. This pin is especially intended to enable the automatic assembly of the stop plate 6.

Figure 8:
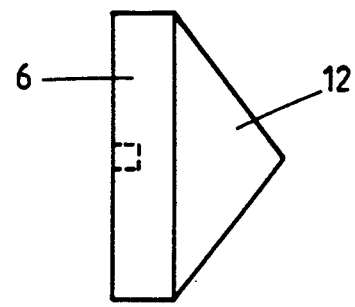
Figure 9:
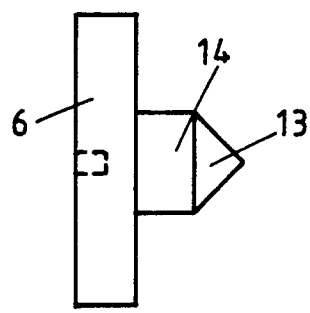

In order to optimize the aero- or hydrodynamic structure of the fluid moving from the space 2 to the space 3, a bulge which is part of the stop plate 6, can be provided while maintaining said pin 11 or instead of the latter. This bulge can present different shapes. According to FIG. 8, this bulge can take the shape of a triangle 12 whereas in FIG. 9 this can be a smaller triangle 13, the base of which coincides with a rectangle 14.

Figure 10:
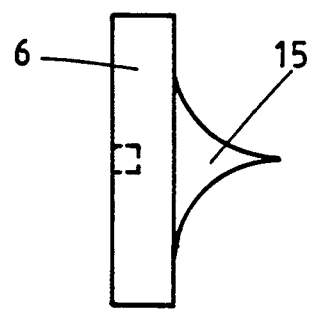
Figure 11:
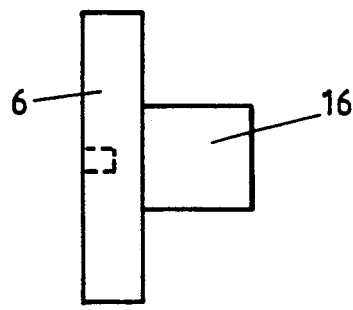
Figure 12:
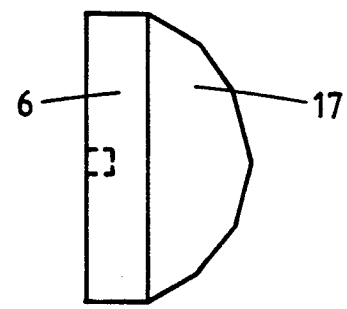

Another possible embodiment is shown in FIG. 10 wherein a triangular bulge 15 having two concave sides can be seen. Yet another, however from an aero- or hydrodynamic point of view less advantageous embodiment, consists in a rectangular 16 (FIG. 11). Finally, the same effect can also be obtained by applying a vault shaped body 17 comprising planes set-up according to an arch (FIG. 12).

Figure 13:
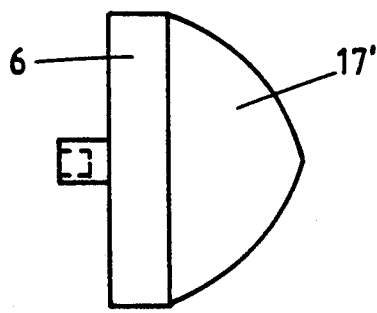

The bulge 17' according to FIG. 13 has an aspherical shape.

The jet propulsion activating elements which, as already emphasized, are together with the little bridge 7 part of the housing 1 of the flow sensor, can take several shapes, four of which are shown in FIGS. 3 to 6 by way of example.

A first embodiment is shown in FIG. 3 wherein the jet propulsion activating elements 18 present such a profile that between two adjoining sides of such elements a curved channel is formed, the side walls of which are substantially parallel. The way the entering fluid is made to whirl by the presence of said jet propulsion activating elements 18, is indicated by the little arrows.

Figure 4:
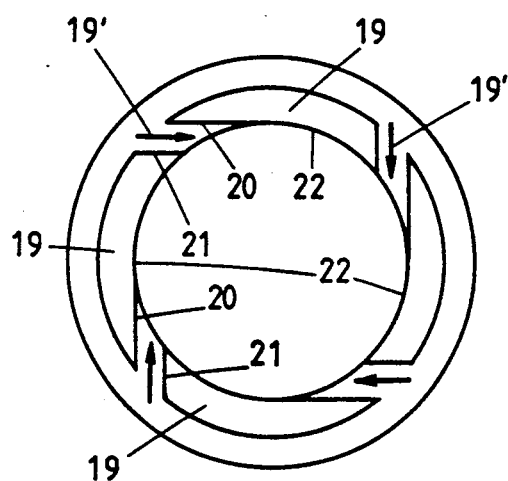

In FIG. 4 the fluid is also made to whirl by curved jet propulsion activating elements 19 which partly present a straight wall 20 forming together with the wall 21 of an adjoining jet propulsion activating element 19 a channel with two parallel walls. Also in this case the fluid is made to whirl by the fact that the entering fluid is deflected against the concave inner side 22 of a jet propulsion activating element.

Figure 5:
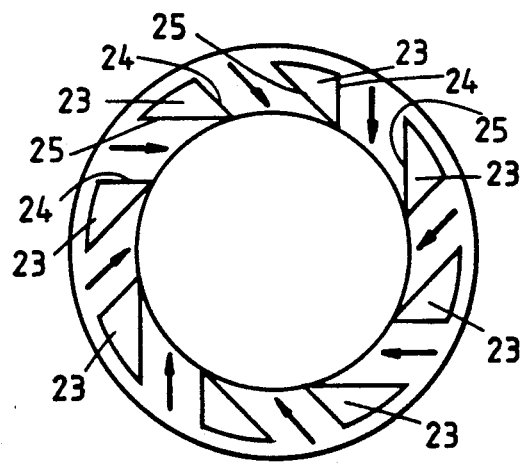

FIG. 5 shows a particular embodiment wherein triangular jet propulsion activating elements 23 are set up in such a manner that the entering fluid which is guided between two parallel walls 24 and 25 of the respective elements, is still made to whirl according to the same principle.

Figure 6:
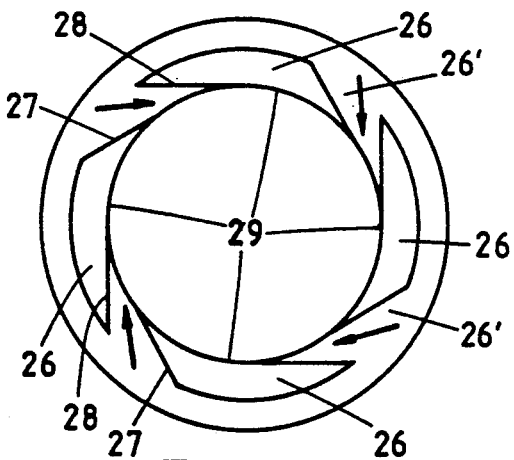

The variant according to FIG. 6 is related to the embodiment according to FIG. 3 except in that between two jet propulsion activating elements 26 a wedge shaped channel is formed. Indeed the sides 27 and 28 of two adjoining elements define a channel that becomes narrower into the direction of the arrows. The entering fluid is however deflected by the concave wall 29 and by the concave part of the wall 29 of each jet propulsion activating element.

An analogous set-up of the jet propulsion activating elements can be seen in FIG. 2 wherein two electronic elements 30 and 31 for measuring the fluid flow rate by means of an infrared beam and/or a voltmeter, are provided diametrally opposite to one another. In this embodiment, related to the embodiment according to FIG. 3, the jet propulsion activating elements 32 define channels 32', the section of which reduces progressively in the direction of the outlet.

In the new structure of the flow sensor according to the invention, the role which can be fulfilled by the stop plate should still be pointed out.

By providing a relief 33 (FIG. 14) on the side of the stop plate 6 facing the rotor 4, the flow characteristics of the fluid and its effect on the rotor 4 can be influenced.

Figure 14:
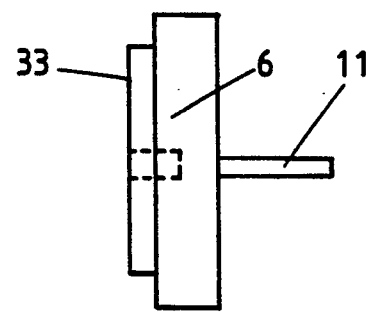
FIG. 14 shows also a side elevational view of a stop plate having at one side a relief, the height of which influences the flow characteristics of the fluid.

Depending on the needs of the flow sensor users, stop plates 6 can be supplied, having a relief with different heights. FIG. 14 shows a stop plate 6 of a certain height. It will be immediately clear that the use of stop plates of different heights defines the "channel size" of the channel formed by the jet propulsion activating elements. This offers the important advantage that the flow sensor can be adapted to the user's needs without having to modify the basic mould in which the housing, bridge and jet propulsion elements included, are formed in one spray step.

In this way, a so-called variable flow control is now possible, i.e. the flow sensor according to the invention can be adapted to the flow rates to be measured. Indeed, the same housing, equipped with a stop plate 6 showing another relief will, as already explained, give rise to completely different flow characteristics. The use of stop plates having different reliefs allows to obtain a higher accuracy and a better linearity by using a stop plate which is appropriate for a certain flow rate range. This is important since the flow sensor has to respond as linearly as possible in the range wherein it is used.

In practice, taking into account the known needs of the market, at least seven different sensors will have to be used when implementing the techniques known up to now.

With the structures according to the invention, the same demand can be fulfilled for example by supplying three different housings which can be used in combination with stop plates with adjusted relief heights.

It will be immediately clear that from the point of view of "production" as well as from the point of view of "use", the flow sensor implies a very important improvement. Of course, this remark applies as well to the jet propulsion activating elements discussed in the preamble as to the structure of the stop plate and this as well on the "production" level as on the "use" level.

It is clear that the invention is not limited to the embodiments described hereabove and that many modifications could be applied to them. In the first place it is clear that the number of jet propulsion activating elements per flow sensor is not limited to the shown examples. At least one jet propulsion activating element may give the same result. The relief 33 on the stop plates 6 can show very various heights or characteristics.

What is claimed is:

1. An apparatus for measuring a fluid flow rate, comprising:
   (a) a cylindrical housing formed as a single integral piece having a through opening defining an inner wall, the inner wall having an enlarged diameter wall portion to provide an axial inlet and having a narrower diameter wall portion at an outlet providing a shoulder therebetween;
   (b) a rotor mounted in the narrower diameter wall portion of the housing;
   (c) a jet propulsion activating element formed in relief on the shoulder of the housing for creating a helicoidally moving fluid flow in the housing near the rotor; and
   (d) a stop plate having an outer circumference, the stop plate mounted in the enlarged diameter wall portion of the housing defining at least one fluid passage therein, the fluid passage being between the outer circumference of the stop plate and the enlarged diameter wall portion of the inner wall.

2. A measuring apparatus as claimed in claim 1, wherein four passages are provided between said plate and the enlarged diameter wall portion of the inner wall of said housing.

3. A measuring apparatus as claimed in claim 1, wherein the enlarged diameter wall portion of said inner wall of said housing is provided with a plurality of inwards directed projections against which said stop plate is clamped.

4. A measuring apparatus as claimed in claim 1, wherein said stop plate is provided with a centre pin at its side directed away from said rotor.

5. A measuring apparatus as claimed in claim 1, wherein said stop plate is provided, at its side directed away from said rotor, with a bulge for directing the circulating fluid towards said passages.

6. A measuring apparatus as claimed in claim 5, wherein said bulge presents a longitudinal section in the shape of a triangle, the base of which coincides with said stop plate.

7. A measuring apparatus as claimed in claim 5, wherein said bulge presents a longitudinal section in the shape of a triangle, the base of which coincides with a side of a rectangle, which rectangle is jointed to said stop plate.

8. A measuring apparatus as claimed in claim 5, wherein said bulge presents a longitudinal section in the shape of a substantially triangular body with two concave sides and a base coinciding with said stop plate.

9. A measuring apparatus as claimed in claim 5, wherein said bulge is rectangular, according to a longitudinal section.

10. A measuring apparatus as claimed in claim 5, wherein said bulge presents a dome-shaped body comprising a surface of several interconnected planes extending to cover said stop plate side.

11. A measuring apparatus as claimed in claim 5, wherein said bulge is aspherical.

12. A measuring apparatus as claimed in claim 1, wherein said jet activating elements are formed by a series of triangles which are integrally located on the shoulder of said housing, the adjoining sides of two adjoining triangles are parallel and are directed in such a manner to impart a whirl motion to the fluid passing between said sides.

13. A measuring apparatus as claimed in claim 1, wherein said jet propulsion activating elements are formed by at least two triangles with curved sides, two adjoining sides of two adjoining triangles defining an arched passage of constant section for the fluid flowing through.

14. A measuring apparatus as claimed in claim 1, wherein said jet propulsion activating elements are formed by at least two locally curved elements, two adjoining sides of two adjoining elements are parallel to each other over a certain distance and form a straight passage for the fluid over said distance, one of said two sides being curved after said straight passage for deflecting the fluid which entered through said straight passage.

15. A measuring apparatus as claimed in claim 1, wherein said jet propulsion activating elements are formed by at least two arched elements, in such a manner that between two adjoining elements a wedge-shaped passage with straight sides is formed.

16. A measuring apparatus as claimed in claim 1, wherein said jet propulsion activating elements are formed by at least two arched elements, in such a manner that between two adjoining elements, a curved passage having a progressively reduced section, is formed.

17. A measuring apparatus as claimed in claim 1, wherein said rotor comprises a shaft, the ends of which are received in conically milled openings provided therefor in a little bridge formed integrally with the narrower diameter wall portion of the housing and in said stop plate.

18. A measuring apparatus as claimed in claim 1, wherein said stop plate is provided, at its side facing the rotor, with a relief, the thickness of which influences the flow characteristics of the fluid flowing through.

* * * * *